United States Patent
Imamura et al.

(10) Patent No.: US 9,519,521 B2
(45) Date of Patent: Dec. 13, 2016

(54) SERVER DEVICE, COMPUTER-READABLE STORAGE MEDIUM AND MOVEMENT CONTROL METHOD

(71) Applicant: FUJITSU LIMITED, Kawasaki (JP)

(72) Inventors: Nobutaka Imamura, Yokohama (JP); Yoshinori Sakamoto, Kawasaki (JP); Hidekazu Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/649,313

(22) Filed: Oct. 11, 2012

(65) Prior Publication Data

US 2013/0138689 A1 May 30, 2013

(30) Foreign Application Priority Data

Nov. 30, 2011 (JP) ................. 2011-263050

(51) Int. Cl.
*G06F 9/50* (2006.01)

(52) U.S. Cl.
CPC .................. *G06F 9/5088* (2013.01)

(58) Field of Classification Search
CPC .................................... G06F 9/4881
USPC ........... 707/770, 634, 636, 692, 694, 705,707/999.101, 999.107, 999.003, 999.004; 717/155, 103
See application file for complete search history.

(56) References Cited

U.S. PATENT DOCUMENTS

| | | | |
|---|---|---|---|
| 7,831,594 B2 * | 11/2010 | Mehta et al. | 707/721 |
| 2003/0158842 A1 * | 8/2003 | Levy et al. | 707/3 |
| 2009/0199198 A1 * | 8/2009 | Horii et al. | 718/104 |
| 2010/0229178 A1 * | 9/2010 | Ito | 718/104 |
| 2012/0084317 A1 | 4/2012 | Sakamoto | |
| 2012/0084788 A1 | 4/2012 | Sakamoto | |
| 2012/0191641 A1 * | 7/2012 | Crupi et al. | 707/602 |

FOREIGN PATENT DOCUMENTS

| | | |
|---|---|---|
| JP | 2005-258552 | 9/2005 |
| JP | 2012-79240 | 4/2012 |
| JP | 2012-79242 | 4/2012 |

OTHER PUBLICATIONS

Daniel J. Abadi et al., "The Design of the Borealis Stream Processing Engine", Proceedings of the 2005 CIDR Conference, 2005, 13 pages.
Mehul A. Shah et al., "Flux: An Adaptive Partitioning Operator for Continuous Query Systems", ICDE, 2003, pp. 1-12.
Extended European Search Report mailed May 4, 2015 in corresponding European Application No. 12189409.1, 6 pages.
Yali Zhu et al., "Dynamic Plan Migration for Continuous Queries Over Data Streams", Proceedings of the 2004 ACM SIGMOD International Conference on Management of Data, 2004, 12 pages.

(Continued)

*Primary Examiner* — Jay Morrison
*Assistant Examiner* — Ken Hoang
(74) *Attorney, Agent, or Firm* — Staas & Halsey LLP

(57) ABSTRACT

A specification unit specifies a cycle in which data to be processed by queries is distributed, the queries being arranged at a node and movable between the nodes and performing a processing when the data matches with a set condition. An instruction unit instructs a node as a movement source to move the queries during a period when the data to be processed by the queries to be moved is not distributed on the basis of the specified cycle.

7 Claims, 12 Drawing Sheets

(56) References Cited

OTHER PUBLICATIONS

Yali Zhu, "Dynamic Optimization and Migration of Continuous Queries Over Data Streams", Worcester Polytechnic Institute, 2006, pp. 211-282.
Chinese Office Action mailed Jun. 7, 2016 in corresponding Chinese Patent Application No. 201210425817.4, 6 pages.
Chinese Office Action issued Aug. 28, 2015 in corresponding Chinese Patent Application No. 201210425817.4, 7 pages.

* cited by examiner

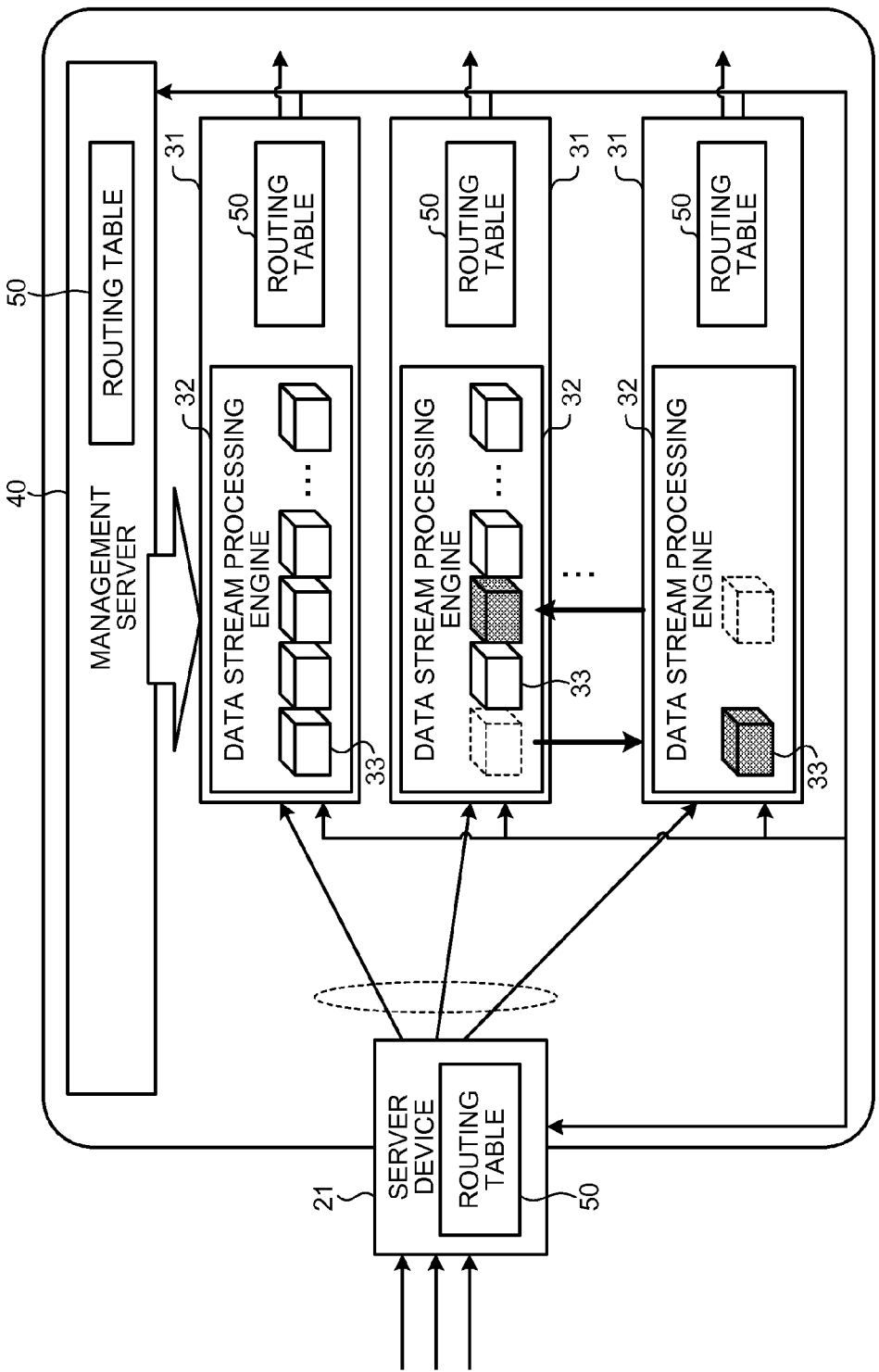

| ID | STORAGE DESTINATION |
|---|---|
| 12 | 1 |
| ⋮ | ⋮ |

| ID | FILE DESCRIPTOR |
|---|---|
| 0 | 6 |
| 1 | 7 |
| 2 | 10 |
| ⋮ | ⋮ |

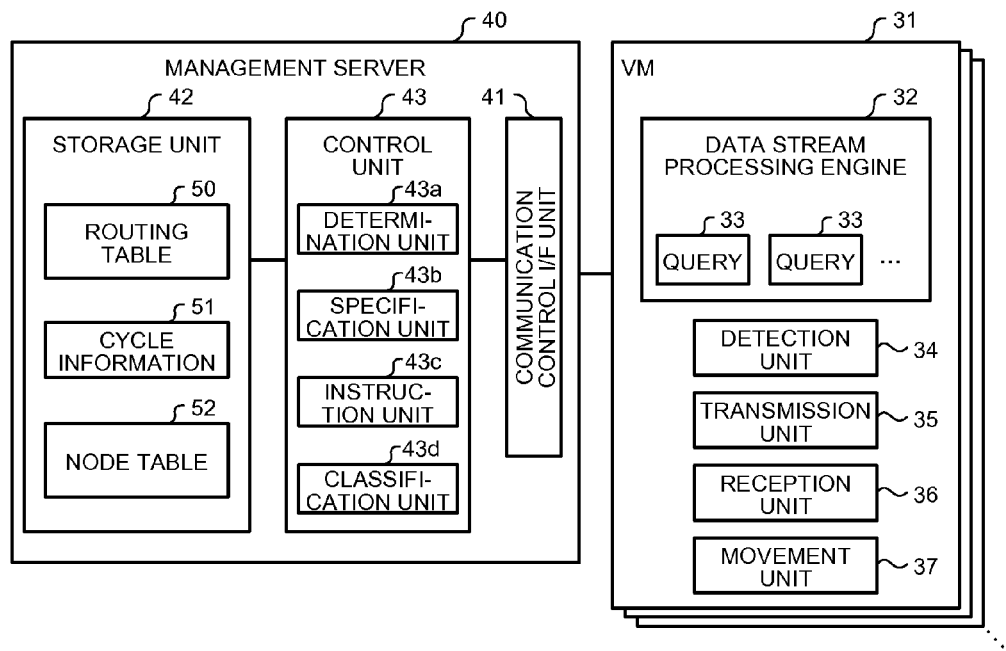

SERVER DEVICE, COMPUTER-READABLE STORAGE MEDIUM AND MOVEMENT CONTROL METHOD

CROSS-REFERENCE TO RELATED APPLICATIONS

This application is based upon and claims the benefit of priority of the prior Japanese Patent Application No. 2011-263050, filed on Nov. 30, 2011, the entire contents of which are incorporated herein by reference.

FIELD

The embodiments discussed herein are directed to a server device, a movement control program and a movement control method.

BACKGROUND

In recent years, there is known a CEP (complex event processing) as a technique for processing many items of data always corrected from various objects in parallel. With the complex event processing, an event is detected for received data and a processing for the detected event is performed. The complex event processing may be called ESP (Event Stream Processing), but is generally called CEP including ESP herein.

In the CEP system that performs a complex event processing, a large amount of received data may be temporarily processed, and thus a processing load may increase and a processing capability may decrease. Since the CEP system processes data in real-time, the CEP system is expected to be always running, and is not allowed to be stopped.

Thus, in the CEP system, a system technique capable of flexibly allocating resources used for cloud and the like is used to distribute processings into a plurality of servers or virtual machines (VM) according to a variation in processing load. For example, a processing request sentence called query and data associated with the query, which are arranged in a server or virtual machine with a high processing load, are moved as processing elements to other servers or virtual machines to distribute the processings.

Patent Literature 1: Japanese Laid-open Patent Publication No. 2005-258552

However, in the CEP system, when the processing elements are moved, a processing of a query as a processing element to be moved is stopped, which causes a delay in the data processing.

SUMMARY

According to an aspect of an embodiment, a server device includes a memory; and a processor coupled to the memory, wherein the processor executes a process includes, specifying a cycle in which data to be processed by queries is distributed, the queries being arranged at a node and movable between the nodes and performing a processing when the data matches with a set condition, and instructing a node as a movement source to move queries during a period when data to be processed by the queries to be moved is not distributed on the basis of the cycle specified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram schematically illustrating the structure of the CEP system according to the third embodiment;

FIG. 13 is a diagram illustrating an exemplary data structure of a node table;

FIG. 14 is a diagram illustrating exemplary functional structures of a management server and a VM according to the fourth embodiment;

DESCRIPTION OF EMBODIMENTS

Preferred embodiments of the present invention will be explained with reference to accompanying drawings. The present invention is not limited to the embodiments. Each embodiment can be combined as needed without departing from the processing contents.

[a] First Embodiment

Figure 1:
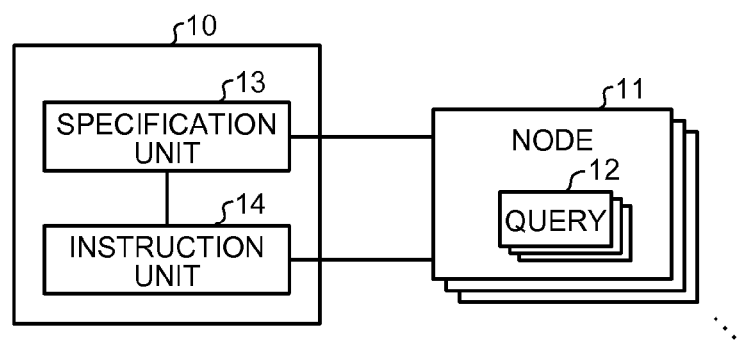
FIG. 1 is a diagram illustrating an entire structure of a CEP system including a server device according to a first embodiment.

A server device according to a first embodiment will be described. FIG. 1 is a diagram illustrating an entire structure of a CEP system including the server device according to the first embodiment. A server device 10 is a physical server for managing the CEP system, and is a management server computer provided in a data sensor or each enterprise. The server device 10 is communicable with a plurality of nodes 11. The node 11 is a server device or a virtual machine operating on a server device. Each node 11 is distributed and arranged with a plurality of queries 12 for executing processings when data matches with a set condition. Each node 11 is distributed with data collected from various objects. The node 11 performs a processing set for the queries 12 when the received data matches with the set condition in the queries 12. The queries 12 arranged in each node 11 are movable between the nodes 11.

As illustrated in FIG. 1, the server device 10 includes a specification unit 13 and an instruction unit 14.

The specification unit 13 makes various specifications. For example, the specification unit 13 specifies a cycle in which data to be processed by queries is distributed. For example, when each node 11 detects a time interval when data to be processed by the queries 12 is distributed, and a phase relative to a predetermined reference and transmits the same to the server device 10, the specification unit 13 may specify a cycle based on the detection result transmitted from each node 11. By way of example, when the data to be processed is distributed at 00:00:10, 00:01:10, 00:02:10, . . ., and 00:00:00 is assumed as a predetermined reference, the time interval is detected as one minute and the phase relative to the reference is detected as 10 seconds. The predetermined reference may be any time. For example, when a plurality of items of data are distributed to the queries at the same cycle, the phase may be found with reference to a cycle in which any data is distributed.

For example, when the data to be processed by the queries is distributed to the server device 10, the specification unit 13 may detect a time interval when the data is distributed and a phase relative to a predetermined reference to specify a cycle. In this case, the data to be processed by the queries may be distributed to the node 11 and the server device 10. The node 11 may transfer the data to be processed by the queries to the server device 10.

For example, a time interval when the data to be processed by the queries is distributed and a phase are determined and cycle information indicating the time interval and the phase is stored in a storage unit (not illustrated) in the server device 10, the specification unit 13 may specify a cycle based on the stored cycle information.

The instruction unit 14 makes various instructions. For example, while the data to be processed by the queries 12 to be moved is not distributed, an instruction of moving the queries 12 is transmitted to the node 11 as a movement source based on the cycle specified by the specification unit 13.

When receiving the movement instruction, each node 11 moves the queries 12 instructed to move to other node 11.

The example in FIG. 1 illustrates a functional structure and thus the specification unit 13 and the instruction unit 14 are separated, but may be configured in one device, for example. An exemplary device may be an electronic circuit such as a CPU (Central Processing Unit) or MPU (Micro Processing Unit). The device may employ an integrated circuit such as ASIC (Application Specific Integrated Circuit) or FPGA (Field Programmable Gate Array).

The data to be processed by the queries 12 may be cyclic for a distribution timing. For example, when the data to be processed is stock price data on specific securities codes and the stock price data is repeatedly distributed in the order of the securities codes, the stock price data on specific securities codes is repeatedly distributed at predetermined time intervals. For example, when the data to be processed is to be transmitted from a sensor and a transmission cycle of the sensor data is determined, the sensor data is repeatedly distributed in the sensor transmission cycle.

While the data is not distributed, the server device 10 transmits an instruction of moving the queries 12 the node 11. When receiving the instruction of moving the queries 12, the node 11 moves the queries 12.

In this way, the server device 10 specifies a cycle in which the data to be processed by the queries 12 is distributed, the queries being arranged in the node 11 and being movable between the nodes 11 and performing a processing when the data matches with a set condition. Then, the server device 10 instructs the node 11 as a movement source to move the queries 12 while the data to be processed by the queries 12 to be moved are not distributed, on the basis of the specified cycle. Thereby, the server device 10 can prevent the processing of the data to be processed by the queries 12 and the movement timing of the queries 12 from being overlapped, thereby restricting a delay in the data processing.

[b] Second Embodiment

Figure 2:
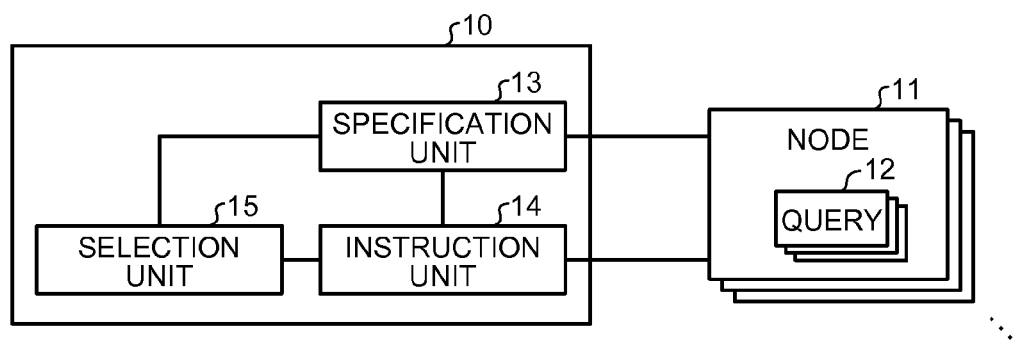
FIG. 2 is a diagram illustrating an entire structure of a CEP system including a server device according to a second embodiment.

A second embodiment will be described. FIG. 2 is a diagram illustrating an entire structure of a CEP system including the server device according to the second embodiment. The same parts as those in the first embodiment are denoted with the same reference numerals, and an explanation thereof will be omitted.

As illustrated in FIG. 2, the server device 10 further includes a selection unit 15.

The selection unit 15 makes various selections. For example, when a plurality of queries 12 as movement candidates are present, the selection unit 15 selects a query whose period until data to be processed next is distributed is long, as a movement target, on the basis of the cycle specified by the specification unit 13. The query 12 as a movement candidate may be designated by a manager, for example. A query 12 meeting a predetermined condition, such as a large number of items of data to be distributed or a small number of items of data may be the query 12 as a movement candidate.

The instruction unit 14 transmits an instruction of moving the query 12 to the node 11 as a movement source while the data to be processed by the query 12 selected by the selection unit 15 is not distributed, on the basis of the cycle specified by the specification unit 13.

In this way, when a plurality of queries 12 as movement candidates are present, the server device 10 selects a query whose period until data to be processed next is distributed is long as a movement target. Then, the server device 10 transmits an instruction of moving the query 12 while the data to be processed by the selected query 12 is not distributed. Thereby, the server device 10 can secure the period until the data is distributed to be longer, thereby preventing the processing of the data to be processed by the query 12 and the movement timing of the query 12 from being overlapped.

[c] Third Embodiment

Figure 3:
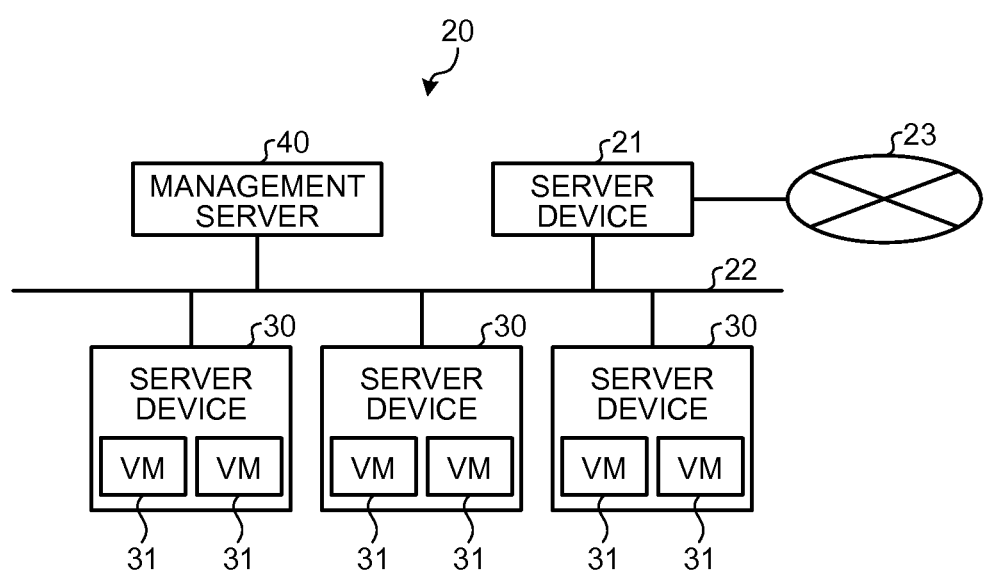
FIG. 3 is a diagram illustrating an exemplary structure of a CEP system according to a third embodiment.

A third embodiment will be described. According to the third embodiment, there will be described a CEP system 20 in which a plurality of VM (Virtual machine) 31 operate on a plurality of server devices 30, respectively, and a plurality of queries 33 are distributed and arranged on the VMs 31, respectively. FIG. 3 is a diagram illustrating an exemplary structure of the CEP system according to the third embodiment. The CEP system 20 includes a server device 21, a plurality of server devices 30 and a management server 40. The server device 21, each server device 30 and the management server 40 are communicable via a network 22. One form of the network 22 may be an arbitrary communication network such as LAN (local Area Network) or VPN (Virtual Private Network) irrespective of being wired or wireless.

The VM 31 operates on the server device 30. Each VM 31 is distributed and arranged with the plurality of queries 33. The server device 21 receives data from various objects via an external network 23 and distributes the received data to the VMs 31 where the queries 33 for processing the data are arranged. The management server 40 manages the server device 21 and each server device 30, and controls the movement of the queries 33 arranged in each VM 31. Three server devices 30 are illustrated in the example of FIG. 3, but any number of server devices 30 may be employed.

FIG. 4 is a diagram schematically illustrating the structure of the CEP system according to the third embodiment. The server device 21, the VM 31 and the management server 40 each store a routing table 50 storing arrangement destinations of the queries 33 per data to be processed by each query 33.

The server device 21 receives many items of data from various objects via the external network 23. The server device 21 performs a preprocessing of adjusting the received data in a predetermined data structure. Then, the server device 21 specifies the arrangement destinations of the queries 33 for processing the received data based on the routing table 50, and transmits the data subjected to the preprocessing to the VMs 31 at the specified arrangement destinations. In the present embodiment, one server device 21 is illustrated, but the plurality of server devices 21 may be provided and the received data may be classified by the server devices 21.

The VM 31 operates a data stream processing engine 32. The data stream processing engine 32 is software for realizing a complex event processing. The data stream processing engine 32 matches the received data with a conditional equation of the query 33 to detect an event, and controls to perform a processing of the detected event. The CEP system 20 can cause the queries 33 to perform a series of processings. For example, an execution result data of an upper query 33 is transmitted to a lower query 33 to be input data of the lower query 33. When the plurality of queries 33 perform a series of processings, the data stream processing engine 32 transmits the execution result data of the queries 33 to the VM 31 operating on the lower query 33. The data stream processing engine 32 controls to move the query 33 to the data stream processing engine 32 operating on other VM 31 in response to an instruction of moving the query 33 from the management server 40.

The movement of the query 33 will be described. The query 33 may have associated data. For example, when a processing of finding an average of certain periods of the data to be processed by the query 33 is performed, the data received in a certain period is held for calculating an average. The query 33 may use predetermined data such as a table for the processing. When moving the query 33, the data stream processing engine 32 moves the query 33 and data associated with the query 33 as processing elements.

Figure 5A:
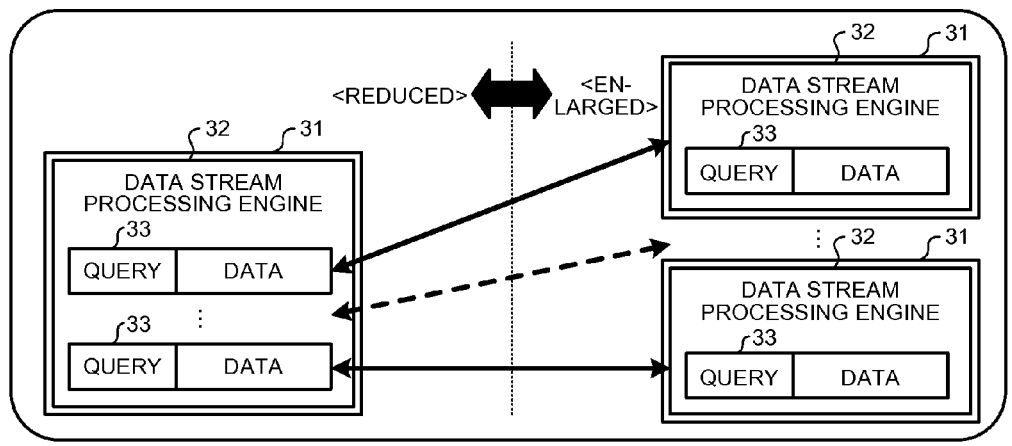
FIG. 5A is a diagram illustrating exemplary query movements.

The movement of the queries 33 will assume the following cases. FIG. 5A is a diagram illustrating exemplary movements of the queries. As illustrated in FIG. 5A, when data to be processed is different per query 33, the queries 33 are moved to process the data to be processed at the movement destinations. For example, when the processings are distributed, each query 33 is moved to a different VM 31 where the data is processed. On the other hand, for example, when a processing load is low, the queries 33 are moved to one VM 31 where the data is processed.

Figure 5B:
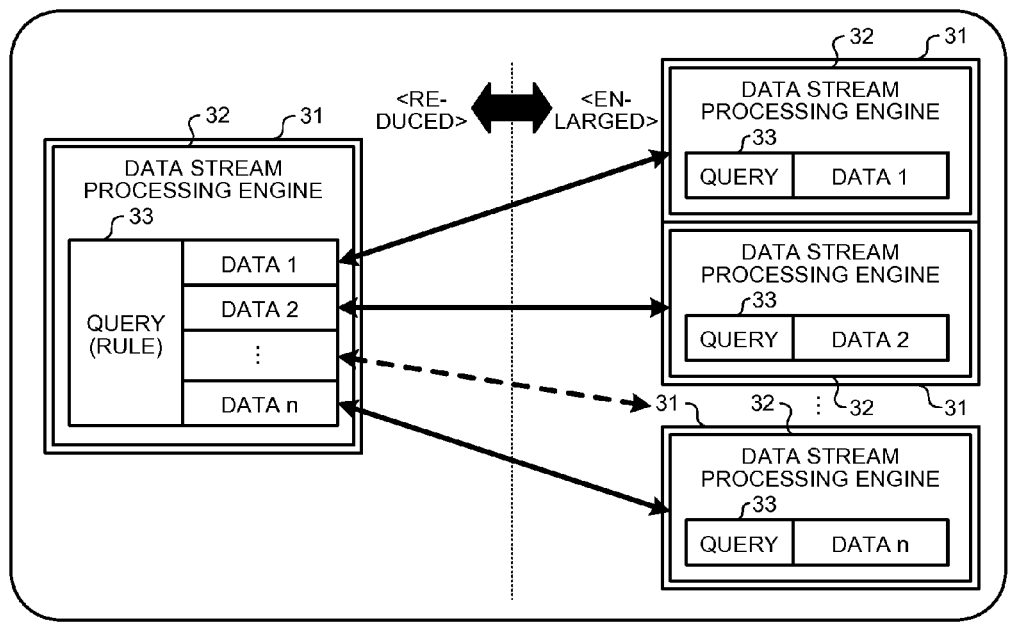
FIG. 5B is a diagram illustrating other exemplary query movements.

On the other hand, the query 33 may process a plurality of items of data. For example, it is assumed that securities codes and stock prices as data are distributed to the VMs 31 and a processing of finding a movement average of the stock prices in a certain period per securities code is performed by one query 33. FIG. 5B is a diagram illustrating other exemplary movements of the queries. As illustrated in the left of FIG. 5B, the queries 33 are to process data 1 to n. In this case, the queries 33 are moved for the data 1 to n to be processed. For example, when the processings are distributed, the query 33 is copied to be moved to another VM 31 and the data 1 to n to be processed is processed by different VMs 31, respectively. On the other hand, for example, when the processing load is low, the queries 33 are collected in one VM 31 and the data 1 to n to be processed is processed by one VM 31.

Figures 6, 7:
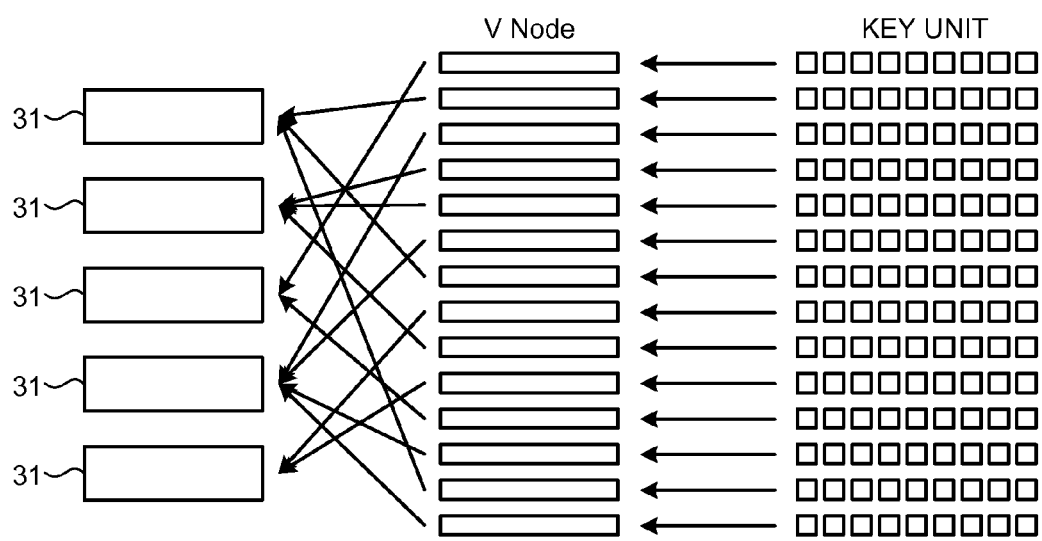
FIG. 6 is a diagram illustrating exemplary grouping of queries 33.
FIG. 7 is a diagram illustrating an exemplary data structure of a routing table.

When each query 33 is individually instructed to move and is moved, as a larger number of queries 33 to be moved are present, a larger number of times of movement instructions are made. When an arrangement destination is stored in the routing table 50 per data to be processed by the query 33, the routing table 50 has a larger amount of data as the number of items of data to be processed by the query 33 increases. In the present embodiment, a plurality of queries 33 are divided into a plurality of groups and are moved per group. The routing table 50 manages a storage destination per group. FIG. 6 is a diagram illustrating exemplary grouping of the queries 33. For example, it is assumed that each data to be processed contains a key for identifying each data by 32-bit integer data and a different key is set for the processing conditions of the queries 33, respectively. In this case, for example, the queries 33 having the same remainder obtained by dividing the key set for the processing condition by a predetermined integer value are grouped into the same group. By way of example, the queries 33 having the same remainder obtained by dividing the key set for the processing condition by 8191 are statically grouped in the same group. Thereby, each query 33 is divided into 8191 groups. In the example of FIG. 6, each group of queries 33 is indicated as V-Node. Then, in the present embodiment, the queries 33 are arranged in a VM 31 per V-node.

The routing table 50 stores therein an arrangement destination per V-Node. FIG. 7 is a diagram illustrating an exemplary data structure of the routing table. As illustrated in FIG. 7, the touring table 50 includes the respective items of ID and storage destination. The item of ID is a region for storing an ID for identifying a V-Node. The item of storage destination is a region for storing an ID indicating the VM 31 as a storage destination. In the example of FIG. 7, a V-Node with the ID "12" indicates that the ID of the VM 31 as a storage destination is "1".

The server device 21 and the data stream processing engine 32 in each VM 31 determine a storage destination of the query 33 based on the key. For example, when the key contained in the received data is 8203, the server device 21 finds 12 which is a remainder obtained by dividing 8203 by 8191. Then, the server device 21 finds a storage destination where the ID of the V-node is 12 from the routing table 50. In the example of FIG. 7, the ID of the VM 31 as a storage destination for the V-Node ID with the ID of 12 is found to be 1.

Figures 8, 9:
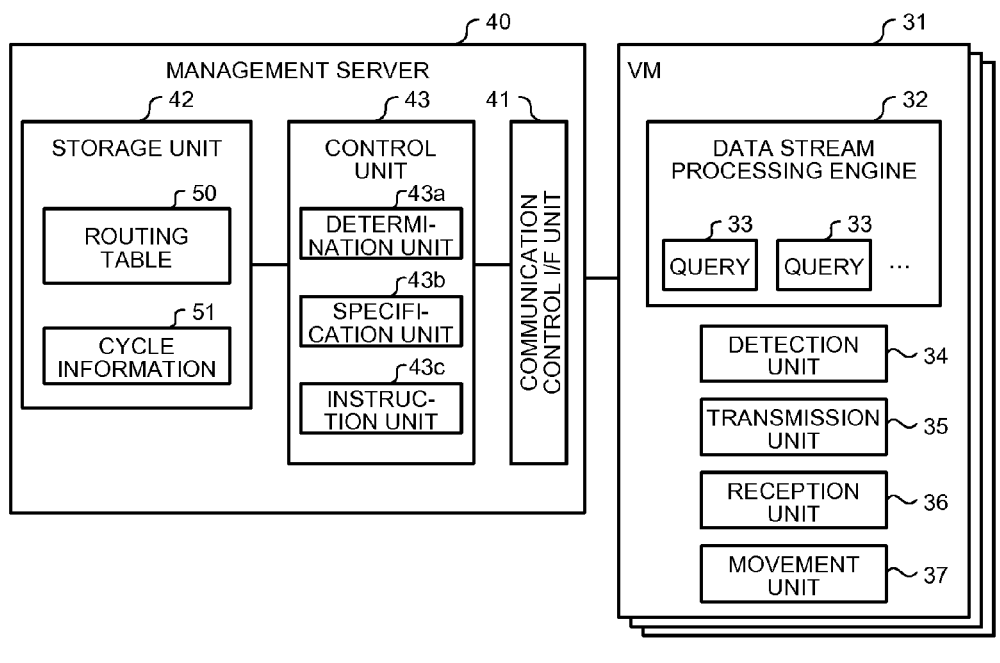
FIG. 8 is a diagram illustrating an exemplary data structure of a storage destination table.
FIG. 9 is a diagram illustrating exemplary functional structures of a management server and a VM according to the third embodiment.

An IP address and a port number for making communication are determined for each VM 31 and a file descriptor is allocated corresponding to the IP address and the port number of each VM 31. The server device 21, each VM 31 and the management server 40 store a file descriptor number and the ID indicating each VM 31 in the storage destination table, respectively. FIG. 8 is a diagram illustrating an exemplary data structure of the storage destination table. As illustrated in FIG. 8, the storage destination table has the respective items of ID and file descriptor. The item of ID is a region for storing an ID of the VM 31. The item of file descriptor is a region for storing a file descriptor number allocated to a communication path to the VM 31 with the ID. The example of FIG. 8 indicates that the file descriptor number allocated to the communication path to the VM 31 with the ID "0" is "6".

When communication is made with the VM 31, a file descriptor number corresponding to the ID of the VM 31 to be communicated is found from the storage destination table. For example, when the ID of the VM 31 to be communicated is "1", the file descriptor number of the VM 31 with the ID "1" is found to be "7" from the storage destination table. Then, the found file descriptor number is used to communicate with the VM 31 to be communicated via a TCP/IP socket.

Each VM 31 detects a time interval when data to be processed by each arranged query 33 is distributed, and a phase relative to a predetermined reference, and transmits the detected interval and phase as cycle information indicating a cycle to the management server 40. The management server 40 specifies a cycle in which the data to be processed by each query 33 is distributed on the basis of the received cycle information.

Each VM 31 detects a resource load state such as a use rate of the allocated CPU or memory from the server device 30, and transmits load information indicating the detected load state to the management server 40. The management server 40 specifies a query 33 to be moved based on the load information transmitted from each VM 31. Then, the management server 40 transmits a movement instruction to the query 33 to be moved while data is not distributed. In the present embodiment, the query 33 is moved in units of V-Node. The management server 40 transmits a movement instruction containing the ID of the VM 31 as a movement destination and the ID of the V-Node to be moved to the VM 31 as a movement source. The data stream processing engine 32 in the VM 31 having received the movement instruction serializes the processing elements such as the query 33 belonging to the V-Node to be moved and the data associated with the query 33 and transmits the same to the VM 31 as a movement destination.

The data stream processing engine 32 in the VM 31 as a movement destination deserializes and recovers the transmitted data and starts driving the recovered query 33. The data stream processing engine 32 updates the storage destination of the query 33 belonging to the V-Node to be moved, which is stored in the routing table 50, to the ID of the VM 31 operated by the data stream processing engine 32. Then, the data stream processing engine 32 notifies the ID of the V-Node to be moved and the ID of the VM 31 as a movement destination to each VM 31, the server device 21 and the management server 40.

When being notified of the movement, each VM 31, the server device 21 and the management server 40 update the storage destination of the query 33 belonging to the V-Node to be moved, which is stored in the routing table 50, to the notified ID of the VM 31 as a movement destination.

FIG. 9 is a diagram illustrating exemplary functional structures of the management server and the VM according to the third embodiment. As illustrated in FIG. 9, the VM 31 includes the data stream processing engine 32, a detection unit 34, a transmission unit 35, a reception unit 36 and a movement unit 37.

The data stream processing engine 32 matches the data distributed to the VM 31 with the conditional equation of the query 33 to detect an event, and performs a processing on the detected event.

The detection unit 34 performs various detections. For example, the detection unit 34 periodically detects a time interval when data to be processed by the query 33 is distributed and a phase relative to a predetermined reference per arranged query 33. The detection unit 34 periodically detects a resource load state of the VM 31.

The transmission unit 35 performs various transmissions. For example, the transmission unit 35 periodically transmits the time interval when the data to be processed by each query 33 is distributed and the phase, which are detected by the detection unit 34, as cycle information indicating a cycle to the management server 40. The transmission unit 35 moves load information indicating the load state periodically detected by the detection unit 34 to the management server 40.

The reception unit 36 receives various instructions. For example, the reception unit 36 receives an instruction of moving a V-Node.

The movement unit 37 performs various movements. For example, when having received the instruction of moving a V-Node, the movement unit 37 moves each query 33 in the V-Node to be moved to the VM 31 as a movement destination. The respective processings of the detection unit 34, the transmission unit 35, the reception unit 36 and the movement unit 37 may be performed by the data stream processing engine 32.

On the other hand, the management server 40 includes a communication control I/F unit 41, a storage unit 42 and a control unit 43.

The communication control I/F unit 41 is an interface which has at least one port and controls communication with each VM 31 and the server device 21. The communication control I/F unit 41 exchanges various items of information with each VM 31 and the server device 21. For example, the communication control I/F unit 41 receives the cycle information or the load information from the VM 31. The communication control I/F unit 41 transmits various instructions to the VM 31.

The storage unit 42 stores various items of information therein. For example, the storage unit 42 stores the routing table 50 and a cycle information 51 therein. Exemplary devices of the storage unit 42 may include a data rewritable semiconductor memory such as flash memory or NVSRAM (Non Volatile Static Random Access Memory), and a storage device such as hard disk or optical disk.

The control unit 43 is an electronic circuit such as a CPU having an internal memory, for example, and includes a determination unit 43a, a specification unit 43b and an instruction unit 43c.

The determination unit 43a makes various determinations. For example, the determination unit 43a determines whether the load state of each VM 31 indicated by the load information transmitted from each VM 31 is a permitted load or more.

The specification unit 43b performs various specifications. For example, the specification unit 43b specifies a cycle in which data to be processed by the queries belonging to each V-Node is distributed per V-Node on the basis of the cycle information 51 stored in the storage unit 42. The specification unit 43b re-specifies the cycle whenever receiving the cycle information 51 from each VM 31.

When the determination unit 43a determines that a VM 31 having a permitted load or more is present, the specification unit 43b specifies the VM 31 having a permitted load or more as a movement source. The specification unit 43b specifies any VM 31 having a low load state as a movement destination. The specification unit 43b specifies any V-Node arranged in the VM 31 having a permitted load or more as a movement target. Then, the specification unit 43b specifies a period when data to be processed by each query 33 in the V-Node to be moved is not distributed on the basis of the cycle in which the data is distributed per V-Node. For example, the specification unit 43b determines whether the data to be processed by any query 33 belonging to the V-Node to be moved is received in a predetermined period per predetermined period when the queries 33 can move in units of V-Node from a current time, and specifies a period when the data is not received. For example, the specification unit 43b specifies a period when the data to be processed by each query 33 in the V-Node to be moved is not distributed on the basis of the cycle in which the data per V-Node is distributed. Then, when the specified period is equal to or more than the predetermined period when the queries 33 can move in units of V-Node, the specification unit 43b specifies the specified period as a period when the data is not received.

The instruction unit 43c instructs to move the V-Node in the specified period by the specification unit 43b when the data is not received. For example, the instruction unit 43c transmits the instruction of moving the V-Node to be moved while the data is not received assuming that the VM 31 determined to have a permitted load or more is a movement source and the VM 31 having a low load state is a movement destination.

Figure 10:
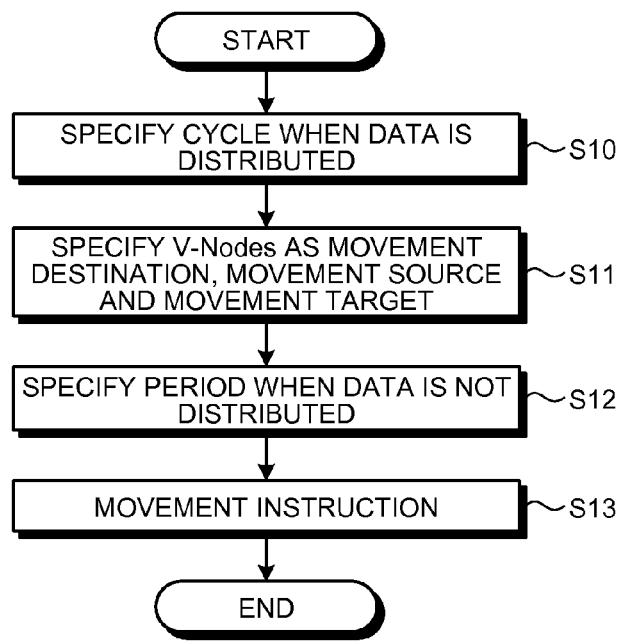
FIG. 10 is a flowchart illustrating a procedure of movement control processings.

A flow of the processings, by the management server 40, of instructing to move a query 33 according to the present embodiment will be described below. FIG. 10 is a flowchart illustrating a procedure of the movement control processings. The movement control processings are performed when a VM 31 is in a load state with a permitted load or more, for example.

As illustrated in FIG. 10, the specification unit 43b specifies a cycle in which data is distributed per V-Node on the basis of the cycle information 51 stored in the storage unit 42 (step S10). The specification unit 43b specifies a VM 31 having a permitted load or more as a movement source, a VM 31 having a low load state as a movement destination, and any V-Node arranged in a VM 31 having a permitted load or more as V-Node to be moved (step S11). Then, the specification unit 43b specifies a period when data is not distributed on the basis of the cycle specified per V-Node (step S12). The instruction unit 43c instructs to move the V-Node in the specified period (step S13), and terminates the processing.

In this way, the management server 40 specifies a cycle in which data to be processed by queries belonging to the V-Node is distributed per V-Node. Then, the management server 40 instructs the VM 32 as a movement source to move each query 33 in the V-Node to be moved during the period when data to be processed by each query 33 in the V-Node to be moved is not distributed on the basis of the specified cycle. Thereby, the management server 40 can prevent the data processing by each query 33 in the V-Node to be moved and the movement timing of each query 33 in the V-Node to be moved from being overlapped, thereby restricting a delay in the data processing.

The management server 40 periodically re-specifies the cycle, and thus can prevent the data processing of the query 33 and the movement timing of the query 33 from being overlapped even when the cycle in which data to be processed by the query 33 is distributed is varied.

[d] Fourth Embodiment

Figure 11:
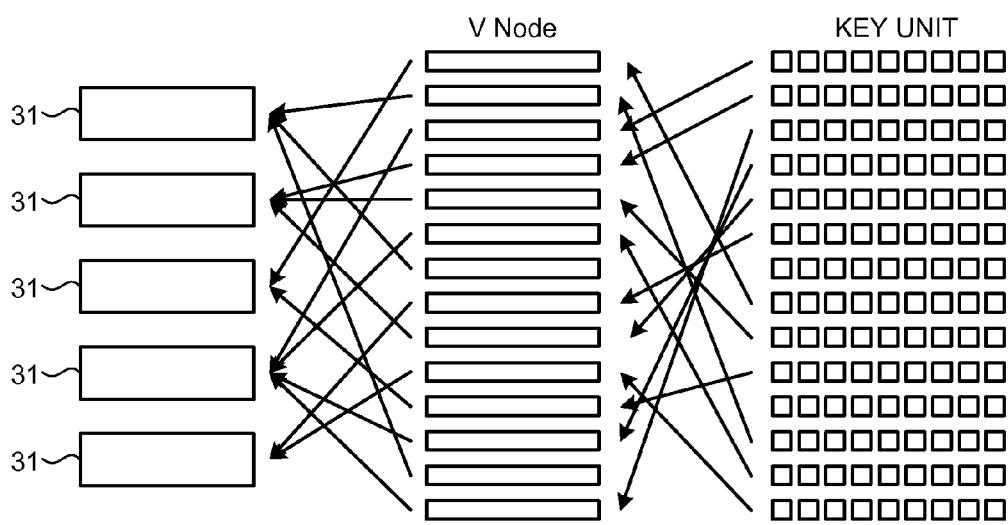
FIG. 11 is a diagram illustrating exemplary grouping of queries.

A fourth embodiment will be described. A structure of a CEP system according to the fourth embodiment is almost the same as the third embodiment described above, and only different parts will be described. Also in the present embodiment, a plurality of queries 33 are divided into a plurality of groups, and are moved per group as in the third embodiment. In the present embodiment, a group to which the queries 33 belong can be dynamically changed. FIG. 11 is a diagram illustrating exemplary query grouping. As illustrated in FIG. 11, the queries 33 can dynamically change their belonging V-Node. Also in the present embodiment, the queries 33 are arranged in the VMs 31 per V-Node.

Figure 12:
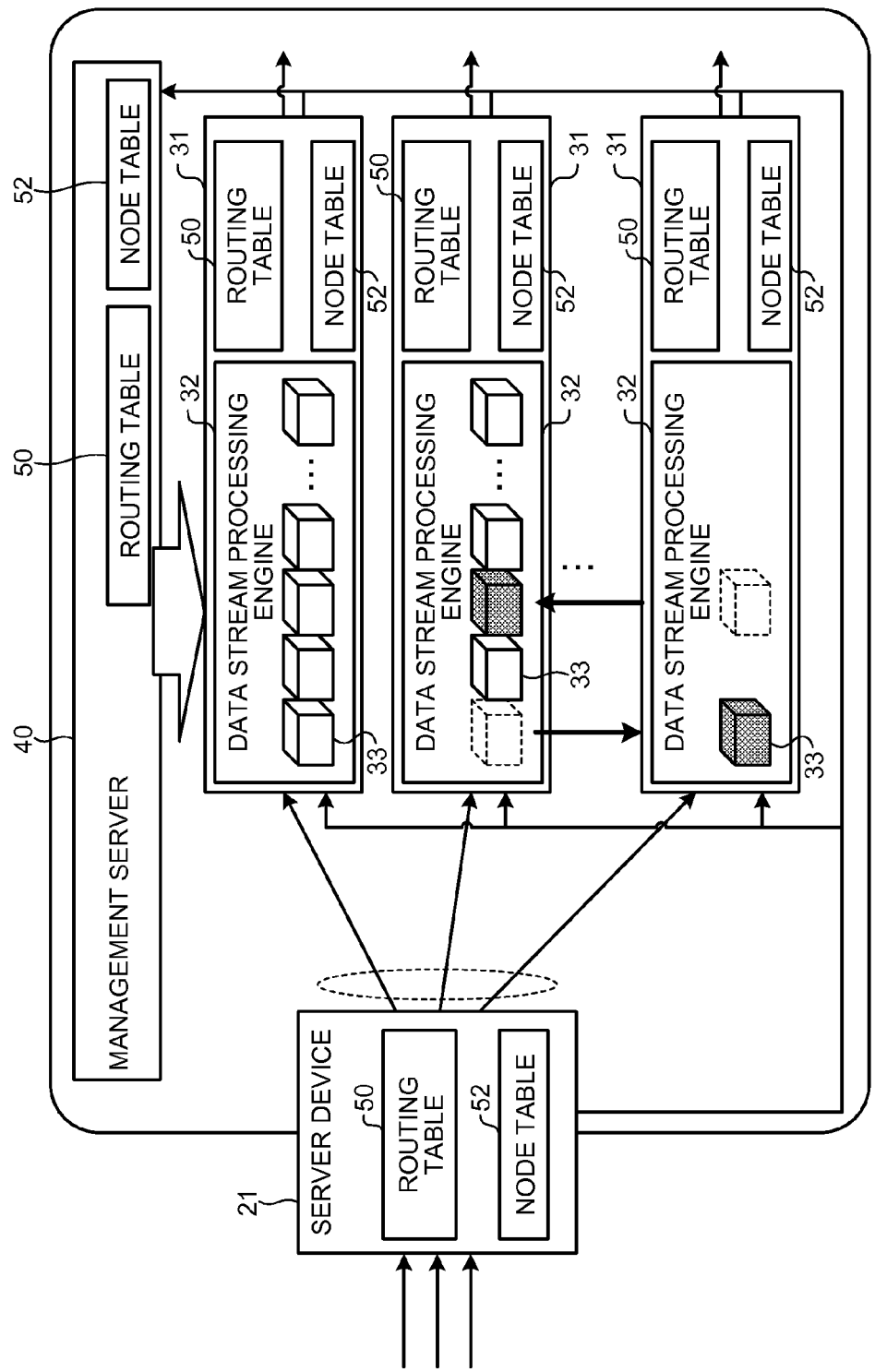
FIG. 12 is a diagram schematically illustrating a structure of a CEP system according to a fourth embodiment.

FIG. 12 is a diagram schematically illustrating the structure of the CEP system according to the fourth embodiment. The same parts as those in the third embodiment are denoted with the same reference numerals and an explanation thereof will be omitted. As illustrated in FIG. 12, a server device 21, a VM 31 and a management server 40 further store therein a node table 52 storing V-Node to which each query 33 belongs, respectively.

The node table 52 is directed for storing a V-Node to which each query 33 belongs. FIG. 13 is a diagram illustrating an exemplary data structure of the node table. As illustrated in FIG. 13, the node table 52 includes items of key and node ID. The item of key is a region for storing a key for identifying data to be processed by each equerry 33. The item of ID is a region for storing an ID of V-Node. The example of FIG. 13 indicates that a query 33 with the key "1234" as a processing condition belongs to a V-Node with the ID "12". In the present embodiment, a data distribution destination is found based on the key contained in the data to be processed by the query 33. An arrangement destination of the query 33 is found based on the key set as the processing condition of the query 33. For example, when receiving data, the server device 21 finds an ID of the V-Node corresponding to the key contained in the received data on the basis of the node table 52. Then, the server device 21 finds an ID of the VM 31 as a storage destination corresponding to the ID of the V-Node on the basis of the routing table 50, and transmits the received data to the VM 31 as a storage destination.

FIG. 14 is a diagram illustrating exemplary functional structures of the management server and the VM according to the fourth embodiment. The same parts as those in the third embodiment are denoted with the same reference numerals, and an explanation thereof will be omitted. As illustrated in FIG. 14, the control unit 43 in the management server 40 further includes a classification unit 43d.

The specification unit 43b specifies a cycle in which data to be processed is distributed for a plurality of queries 33 on the basis of the cycle information 51 stored in the storage unit 42. The cycle information 51 is periodically transmitted from each VM 31. The specification unit 43b re-specifies the cycle whenever receiving new cycle information 51.

The classification unit 43d makes various classifications. For example, the classification unit 43d assumes the queries 33 having the same cycle and a close phase in the same group on the basis of the cycle specified by the specification unit 43b, and classifies the queries 33 into a plurality of groups. By way of example, the classification unit 43d sorts the queries 33 having the same cycle in an order of phase, and classifies a predetermined number of queries into groups. By way of other example, the classification unit 43d divides the cycle into a plurality of periods for the queries 33 having the same cycle, and groups the queries 33 having the phases belonging to the same period into the same group. Then, the classification unit 43d determines an ID of the V-Node per group.

When a query 33 changes its belonging V-Node as a result of the classification by the classification unit 43d, the instruction unit 43c transmits an instruction of moving the query 33 to an arrangement destination of the new V-Node. The instruction unit 43c updates the ID of the V-Node for the query 33 whose belonging V-Node is changed in the node table 52 stored in the storage unit 42 to the ID of the new V-Node. Further, the instruction unit 43c transmits an instruction of updating the node table 52 containing the key of the query 33 whose belonging V-Node is changed and the ID of the new V-Node to each VM 31 and the server device 21.

When receiving the instruction of updating the node table 52, each VM 31 and the server device 21 update the ID of the V-Node of the query 33 whose belonging V-Node is changed in the node table 52 to the ID of the new-V-Node on the basis of the instruction.

Figure 15:
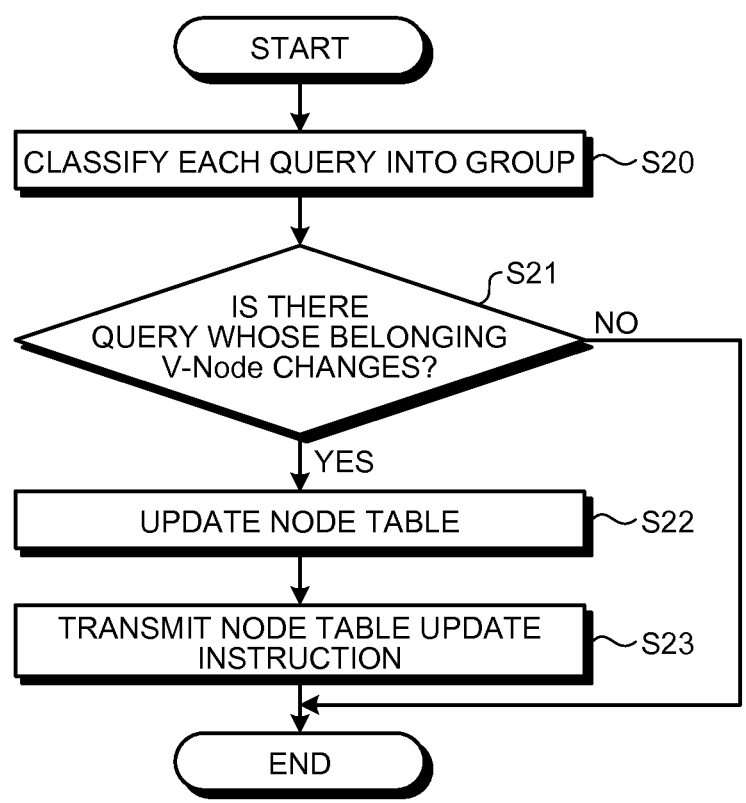
FIG. 15 is a flowchart illustrating a procedure of classification processings.

A flow of the processings, by the management server 40, of classifying the queries 33 according to the present embodiment will be described below. FIG. 15 is a flowchart illustrating a procedure of the classification processings. The classification processings are periodically performed at a timing when the manager instructs or a timing when a cycle in which data is transmitted is specified by the specification unit 43b.

As illustrated in FIG. 15, the classification unit 43d assumes the queries 33 having the same cycle and a close phase in the same group and classifies the queries 33 into a plurality of groups on the basis of the cycle specified by the specification unit 43b (step S20). The instruction unit 43c determines whether a query 33 has changed its belonging V-Node as a result of the classification (step S21). When there is no query 33 whose belonging V-Node has changed (No in step S21), the processing ends. On the other hand, when there is a query 33 whose belonging V-Node has changed (Yes in step S21), the instruction unit 43c updates the ID of the V-Node of the query 33 whose belonging V-Node has changed in the node table 52 to the ID of the new V-Node (step S22). Then, the instruction unit 43c transmits an instruction of updating the node table 52 to each VM 31 and the server device 21 (step S23), and terminates the processing.

In this way, the management server 40 assumes the queries 33 having the same cycle and a close phase in the same group, and classifies the queries 33 into a plurality of V-Nodes. Thus, a period when data to be processed by each query belonging to the V-Node is distributed is focused on a specific period. Thereby, when moving the queries 33 in units of V-Node, the management server 40 moves the queries 33 in a period other than the specific period, thereby preventing the processing of the data to be processed by the queries 33 and the movement timing of the queries 33 from being overlapped.

The management server 40 periodically re-specifies the cycle in which data is distributed, and re-classifies the groups based on the re-specified cycle. Thereby, even when the cycle in which data to be processed by the query 33 is distributed is changed, the management server 40 can prevent the data processing by the query 33 and the movement timing of the query 33 from being overlapped.

[e] Fifth Embodiment

A fifth embodiment will be described. A structure of a CEP system according to the fifth embodiment is almost the same as the third embodiment, and only different parts will be described.

Figure 16:
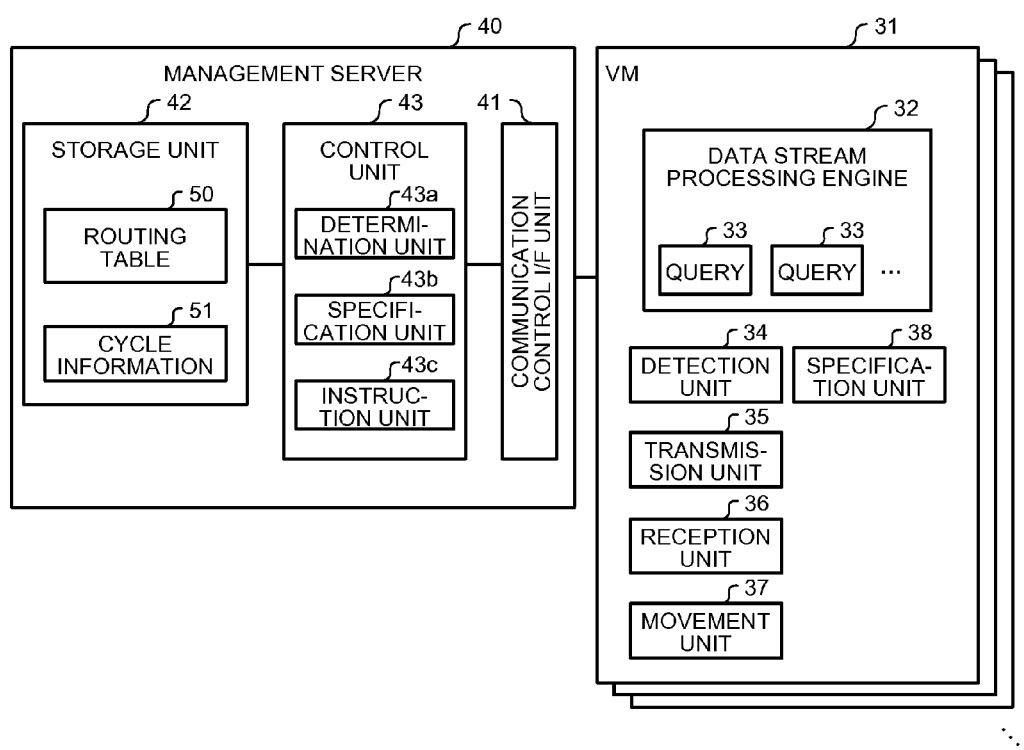
FIG. 16 is a diagram illustrating exemplary functional structures of a management server and a VM according to a fifth embodiment.

FIG. 16 is a diagram illustrating exemplary functional structures of a management server and a VM according to the fifth embodiment. The same parts as those in the third embodiment are denoted with the same reference numerals and an explanation thereof will be omitted. As illustrated in FIG. 16, the VM 31 further includes a specification unit 38.

The specification unit 38 specifies a cycle in which data to be processed by the queries 33 belonging to each V-Node is distributed per V-Node on the basis of the time interval when the data to be processed by each query 33 is distributed and the phase which are detected by the detection unit 34. Then, the specification unit 38 specifies a period when data to be processed by each query 33 in the V-Node is not distributed on the basis of the cycle in which data per V-Node is distributed.

When there is a VM 31 determined to have a permitted load or more, the instruction unit 43c in the management server 40 instructs to move the V-Node. For example, the instruction unit 43c assumes the VM 31 determined to have a permitted load or more as a movement source and the VM 31 in a low load state as a movement destination, and transmits an instruction of moving any V-Node to be moved in the VM 31 having a permitted load or more.

When receiving the instruction of moving the V-Node, the movement unit 37 moves each query 33 in the V-Node to be moved to the VM 31 as a movement destination during the period when data is not distributed, which is specified by the specification unit 43b.

In this way, when the data to be processed by the arranged query 33 is distributed, the VM 31 performs a processing on the query 33. The VM 31 specifies a cycle in which the data to be processed by the query 33 is distributed. The VM 31 receives an instruction of moving the query 33. Then, when having received the instruction of moving the query 33, the VM 31 moves the query 33 to the VM 31 as a movement destination during a period when the data to be processed by the query 33 is not distributed, on the basis of the specified cycle. Thereby, the VM 31 can prevent the data processing of the query 33 to be moved and the movement timing of the query 33 to be moved from being overlapped, thereby restricting a delay in the data processing.

[f] Sixth Embodiment

The embodiments for the disclosed device have been described above, but the disclosed technique may be implemented in various different forms other than the above embodiments. Other embodiments contained in the present invention will be described below.

For example, the third embodiment has described the case where the specification unit 43b determines whether data is to be received, and specifies a period when the data is not received per predetermined period from a current time, but the disclosed device is not limited thereto. For example, when there is no predetermined period when data is not received, within a predetermined permitted period in which a delay in movement is permitted from a current time, the specification unit 43b may specify a predetermined period when a smallest number of items of data are received as a period when a V-Node is to be moved. The specification unit 43b may specify an earliest predetermined period when the number of items of data to be received is a predetermined number or less, instead of the period when a smallest number of items of data are received, as a period when the V-Node is to be moved. Thereby, when a predetermined period when data is not received is not present or when a time up to a predetermined period is a permitted period or more, a period when the V-Node is to be moved can be specified.

The third to fifth embodiments have described the case in which the queries 33 are moved in units of V-Node when the queries 33 are divided into a plurality of groups, but the disclosed device is not limited thereto. For example, a movement may be possible in units of query 33. In this case, the routing table 50 may be configured to store a storage destination in units of query 33.

Each illustrated constituent in each device is functionally conceptual, and does not necessarily need to be physically configured as in the figures. That is, specific forms of distribution and integration of the respective devices are not limited to the illustrated ones, and all or part of the constituents may be functionally or physically distributed or integrated as needed in an arbitrary unit according to various loads or use situations. For example, the specification unit 13, the instruction unit 14 and the selection unit 15 illustrated in FIG. 1 and FIG. 2 may be integrated as needed. For example, the determination unit 43a, the specification unit 43b, the instruction unit 43c and the classification unit 43d illustrated in FIG. 9, FIG. 14 and FIG. 16 may be integrated as needed. For example, the data stream processing engine 32, the detection unit 34, the transmission unit 35, the reception unit 36, the movement unit 37, and the specification unit 38 illustrated in FIG. 9, FIG. 14 and FIG. 16 may be integrated as needed. Further, all or part of the processing functions performed in the processing parts may be realized in the CPU or in an program analyzed and executed in the CPU, or may be realized in wired logic hardware.

Movement Control Program

Figure 17:
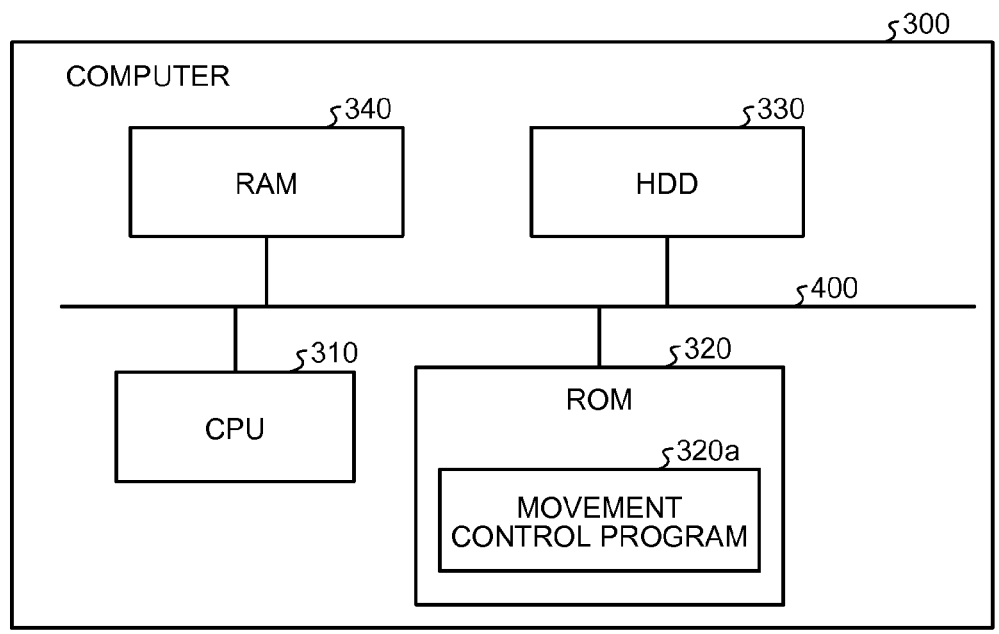
FIG. 17 is a diagram illustrating a computer executing a movement control program.

Various processings described in the above embodiments may be realized by executing the previously-prepared programs in a computer system such as personal computer or work station. An exemplary computer system for executing the programs having the same functions as the embodiments will be described below. FIG. 17 is a diagram illustrating a computer for executing a movement control program.

As illustrated in FIG. 17, a computer 300 includes a CPU (Central Processing Unit) 310, a ROM (Read Only Memory) 320, a HDD (Hard Disk Drive) 330, and a RAM (Random Access Memory) 340. The respective parts 310 to 340 are connected to each other via a bus 400.

The ROM 320 previously stores therein a movement control program 320a for exercising the same functions as the processing parts according to the first to fifth embodiments. For example, the movement control program 320a for exercising the same functions as the specification unit 13, the instruction unit 14, and the selection unit 15 according to the first embodiment and the second embodiment is stored. Alternatively, for example, the movement control program 320a for exercising the same functions as the determination unit 43a, the specification unit 43b, the instruction unit 43c and the classification unit 43d according to the third embodiment and the fourth embodiment is stored. Alternatively, the movement control program 320a for exercising the same functions as the detection unit 34, the transmission unit 35, the reception unit 36, the movement unit 37 and the specification unit 38 according to the third to fifth embodiments is stored. The movement control program 320a may be separated as needed.

Then, the CPU 310 reads and executes the movement control program 320a from the ROM 320 thereby to perform the same operation as the control unit according to the first to fifth embodiments. That is, the movement control program 320a executes the same operations as the specification unit 13, the instruction unit 14 and the selection unit 15 according to the first embodiment and the second embodiment. Alternatively, the movement control program 320a executes the same operations as the determination unit 43a, the specification unit 43b, the instruction unit 43c and the classification unit 43d according to the third embodiment and the fourth embodiment. Alternatively, the movement control program 320a executes the same operations as the detection unit 34, the transmission unit 35, the reception unit 36, the movement unit 37 and the specification unit 38 according to the third to fifth embodiments.

The movement control program 320a does not necessarily need to be originally stored in the ROM 320. The movement control program 320a may be stored in the HDD 330.

For example, the program is stored in a "portable physical medium" such as flexible disk (FD), CR-ROM, DVD disk, magneto-optical disk or IC card inserted into the computer 300. The computer 300 may read and execute the program therefrom.

The program is stored in "other computer (or server)" connected to the computer 300 via a public line, Internet, LAN or WAN. The computer 300 may read and execute the program therefrom.

A delay in the data processing can be restricted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server device comprising:
a memory; and
a processor coupled to the memory, wherein the processor executes a process comprising:
specifying cycle information including cycles and reference times of a plurality of queries, respectively, by detecting the cycles in which data is distributed via a network to a plurality of nodes that the plurality of queries are arranged, the data being distributed to one of the plurality of nodes that the data matches condition of a query arranged, the node being a server or a virtual machine operating on a server;
classifying queries that corresponding data is distributed in a same specified cycle into groups based on the cycle information; and
instructing, when a first group of queries is selected to move, a first node to move the first group of queries during a period in which corresponding data for the first group of queries is not distributed, wherein
the specifying includes periodically specifying the cycle information.

2. The server device according to claim 1, wherein the process further comprises:

selecting a query having a long period until data to be processed next is distributed as a movement target on the basis of the cycle information specified when a plurality of queries to be moved are present.

3. A server device comprising:

a memory; and a processor coupled to the memory, wherein the processor executes a process comprising:

executing a processing of a query when data is distributed, the date being distributed to one of a plurality of nodes that the data matches condition of a query arranged, the nodes being a server or a virtual machine operating on a server;

specifying cycle information including cycles and reference times of a plurality of queries, respectively, by detecting the cycles in which the data is distributed via a network to the plurality of nodes that the plurality of queries are arranged;

classifying queries that corresponding data is distributed in a same specified cycle into groups based on the cycle information;

receiving an instruction of moving a first group of queries; and moving, when the instruction of moving the first group of queries is received, the first group of queries during a period in which corresponding data for the first group of queries is not distributed, wherein the specifying includes periodically specifying the cycle information.

4. A non-transitory computer-readable storage medium storing a movement control program causing a computer to perform:

specifying cycle information including cycles and reference times of a plurality of queries, respectively, by detecting the cycles in which data is distributed via a network to a plurality of nodes that the plurality of queries are arranged, the data being distributed to one of the plurality of nodes that the data matches condition of a query arranged, the node being a server or a virtual machine operating on a server;

classifying queries that corresponding data is distributed in a same specified cycle into groups based on the cycle information; and instructing, when a first group of queries is selected to move, a first node to move the first group of queries during a period in which corresponding data for the first group of queries is not distributed, wherein the specifying includes periodically specifying the cycle information.

5. A movement control method for causing a computer to execute a process comprising:

specifying, using a processor, cycle information including cycles and reference times of a plurality of queries, respectively, by detecting the cycles in which data is distributed via a network to a plurality of nodes that the plurality of queries are arranged, the data being distributed to one of the plurality of nodes that the data matches condition of a query arranged, the node being a server or a virtual machine operating on a server;

classifying, using a processor, queries that corresponding data is distributed in a same specified cycle into groups based on the cycle information; and instructing, using a processor, when a first group of queries is selected to move, a first node to move the first group of queries during a period which corresponding data for the first group of queries is not distributed, wherein the specifying includes periodically specifying the cycle information.

6. A server device comprising:

a memory; and a processor coupled to the memory, wherein the processor executes a process comprising:

specifying cycle information including cycles and reference times of a plurality of processing request sentences, respectively, by detecting the cycles in which data is distributed via a network to a plurality of nodes that the plurality of processing request sentences are arranged, the data being distributed to one of the plurality of nodes that the data matches condition of a processing request sentence arranged, the node being a server or a virtual machine operating on a server;

classifying processing request sentences that corresponding data is distributed in a same specified cycle into groups based on the cycle information; and instructing, when a first group of processing request sentences is selected to move, to move the first group of processing request sentences during a period which corresponding data for the first group of processing request sentences is not distributed, wherein the specifying includes periodically specifying the cycle information.

7. The server device according to claim 1, wherein the classifying includes classifying queries that corresponding data is distributed in a same cycle that is periodically re-specified.

\* \* \* \* \*